United States Patent [19]
Knittel

[11] 4,182,603
[45] Jan. 8, 1980

[54] MULTILAYER TUBULAR EXTRUSION DIE

[75] Inventor: Richard R. Knittel, Martinsville, N.J.

[73] Assignee: Egan Machinery Company, Somerville, N.J.

[21] Appl. No.: 890,198

[22] Filed: Mar. 27, 1978

[51] Int. Cl.² .......................................... B29D 23/04
[52] U.S. Cl. .............................. 425/133.1; 425/380; 425/462; 425/467
[58] Field of Search ................ 264/173, 209; 425/462, 425/133.1, 380, 467

[56] References Cited

U.S. PATENT DOCUMENTS

| | | | |
|---|---|---|---|
| 3,281,897 | 11/1966 | Mercer | 264/209 X |
| 3,649,143 | 3/1972 | Papesh et al. | 425/133.1 X |

FOREIGN PATENT DOCUMENTS 2508919  9/1976  Fed. Rep. of Germany ........ 425/133.1

*Primary Examiner*—Mark Rosenbaum
*Attorney, Agent, or Firm*—David A. Verner

[57] ABSTRACT

A coextrusion die for extruding multilayer thermoplastic material in the form of a tube. The die is of the type known as a spiral mandrel die wherein the die mandrels are provided with helical grooves on their peripheries. At least one spiral mandrel has helical grooves of opposite hand than those of the remaining mandrels.

1 Claim, 2 Drawing Figures

MULTILAYER TUBULAR EXTRUSION DIE

BACKGROUND OF THE INVENTION

1. Field of the Invention

This invention relates to extrusion die apparatus for the extrusion of thermoplastic material in a tubular form and in particular to such apparatus for the extrusion of multilayered tubing. In the description below and in the drawings the apparatus of the present invention is described and shown as it is used for the manufacturing of film by the blown film process, but the apparatus is not so limited but can be used also for the manufacturing of thermoplastic piping and tubing.

2. Description of the Prior Art

The manufacturing of thermoplastic film by the blown film process is well known in the art and reference may be had to U.S. Pat. No. 2,461,975 (Fuller) for a disclosure of the basic process. As shown in this patent, molten plastic material is introduced into an annular die and is extruded therefrom in the form of a tube. The die comprised basically an outer annular body within which is mounted an inner cylindrical mandrel. The plastic flows through the annular space between the body and the mandrel and is changed in form from a cylindrical rod to a tube of the desired diameter.

In order to obtain satisfactory gauge control of the extruded tube, to obtain temperature homogeneity of the material and to eliminate weld lines in the material it has been found desirable to modify the configuration of the outer surface of the mandrel. One of the most successful of these configurations is the incorporation of one or more helical or spiral grooves on the mandrel with the depth of the groove or grooves gradually decreasing toward the downstream end of the die with the grooves ending at some distance from the die orifice. Mandrels with this configuration are generally known as "spiral mandrels" and so shall be called here. With the spiral mandrel, the plastic material not only travels directly downstream in the annulus between the body and mandrel, but a major portion moves in the helical grooves from which, as the groove depth decreases, the material is forced out of the groove and again travels in a generally downstream direction. By this means the material is continuously mixed and blended resulting in a homogeneous condition and elimination of weld lines. This configuration, the spiral mandrel, is well known in the art and is disclosed in U.S. Pat. Nos. 2,260,750 (Kopitke); 2,794,213 (Davis); 3,267,194 (Stenger); 3,376,605 (Beattie); 3,689,192 (Upmeier); and British Pat. No. 823,066.

It is also known in the art to extrude tubing comprising two or more layers of plastic materials, the process being known as coextrusion. The same basic type of extrusion die as above is used with an outer annular body and two or more internal mandrels forming concentric annular passages between the body and mandrel and between the inner mandrels. Reference may be made to Papesh U.S. Pat. Nos. 3,649,143 and 3,966,861 for a disclosure of the apparatus involved in which the use of spiral mandrels is also disclosed.

SUMMARY OF THE INVENTION

The present invention provides a coextrusion die for tubular extrusion having two or more spiral mandrels in which the helical grooves of one or more of the spiral mandrels are of opposite hand than the spiral grooves of the remaining one or more mandrels. Thus in a die for extruding two layered material, one spiral mandrel has right handed helical grooves and the other mandrel has left handed helical grooves. In a die for extruding three or more layers, at least one spiral mandrel has helical grooves of the opposite hand than those of the other spiral mandrels.

DRAWINGS

DESCRIPTION OF THE INVENTION

Figure 1:
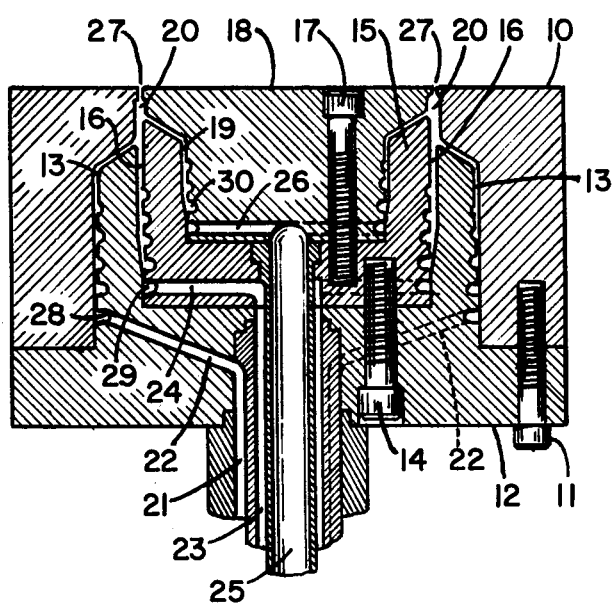
FIG. 1 is a simplified sectional view in elevation through the centerline of a coextrusion blown film die for the extrusion of three layer tubular film.

Referring to FIG. 1, the coextrusion die comprises annular die body 10. Concentrically mounted within the body by means of a plurality of screws 11 is spiral mandrel 12 forming an annular passage 13 between the body 10 and the mandrel 12. Concentrically mounted within mandrel 12 by means of a plurality of screws 14 is spiral mandrel 15 forming an annular passage 16 between mandrel 12 and mandrel 15. Concentrically mounted within mandrel 15 by means of a plurality of screws 17 is spiral mandrel 18 forming an annular passage 19 between mandrel 15 and mandrel 18. The body and mandrels are so configured that the annular passages 13, 16 and 19 are combined into one annular discharge passage 20.

Thermoplastic material is supplied to passage 13 from a source, such as an extruder, through annular passage 21 and thence through a plurality of feed passages 22 in the mandrel 12. Each feed passage 22 leads into the start of a helical groove 28 on the periphery of mandrel 12, there being a separate helical groove for each feed passage. Each helical groove 28 continuously decreases in depth and cross sectional area in the downstream direction and ends at some distance before the annular passage 20. In a similar manner material is supplied to annular passages 16 and 19 from sources through annular passage 23 and passage 25 respectively and then through a plurality of feed passages 24 and 26 respectively to the start of helical groove 29 on mandrel 15 and helical groove 30 on mandrel 18 respectively. As the material travels downstream in the grooves, a portion is continuously forced out of the grooves due to the decreasing depth and cross section and enters the annular passage. The materials from the three annular passages are combined in a laminar manner in annular discharge passage 20 and extruded as a three-layer tube through annular die orifice 27.

Figure 2:
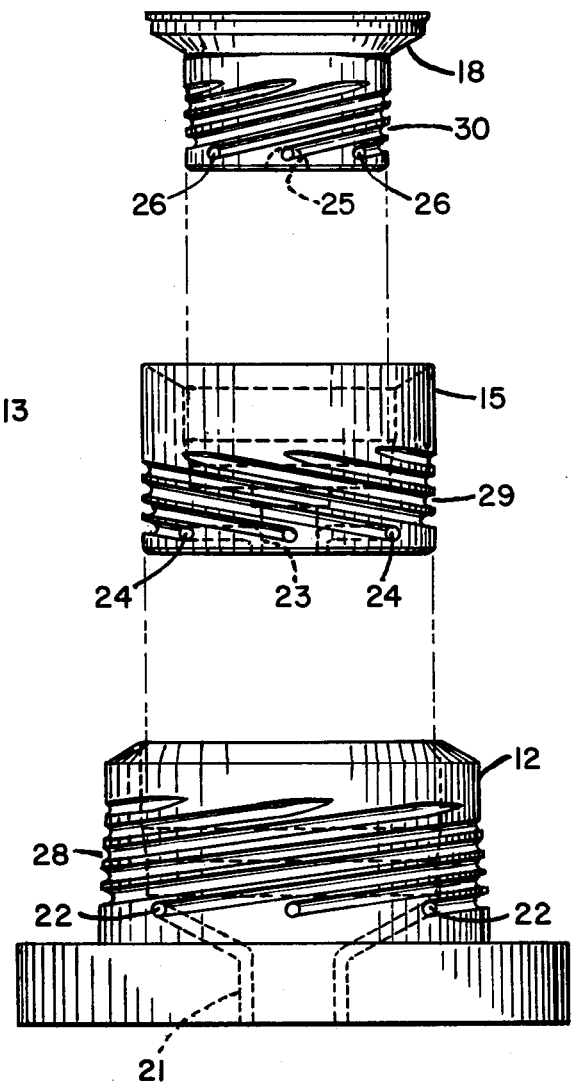
FIG. 2 is an exploded view in side elevation of the spiral mandrels of the die of FIG. 1.

The configuration of the helical grooves can be more clearly seen in FIG. 2 where it will be noted that the grooves of mandrel 15 are of opposite hand to the grooves of mandrels 12 and 18.

It has been found that for best results the spiral mandrel die should have a plurality of spiral grooves and associated feed passages and in general, the greater number practical will result in the best gauge uniformity. There is litte difficulty in providing these in a single mandrel die for single layer extrusion but in dies with more than one mandrel the number of feed passages, and consequently the number of grooves, is limited by the space in the components taken up by the mounting screws such as 14 and 17 in the embodiment shown. It should be noted that the thermoplastic material in the die is at considerable pressure, sometimes 5000 psi or more, and a considerable number and size of screws are required. In a typical die similar to the embodiment shown having an orifice diameter of 12 inches, screws 14 are 1-¼ inch in diameter and eight in number while screws 17 are one inch in diameter and eight in number. The number of feed passages is limited by available space to eight in this embodiment and thus the helical grooves are limited to eight on each mandrel. In addition, the geometry requires that the feed passages, and therefore the starting points of the helical grooves, of each mandrel be stacked above each other in the same vertical plane, and therefore, with the movement of the material through the passages in the same generally helical direction due to the influence of the helical grooves, any non-uniformity in the material, particularly that due to the effect of the feed passages and groove starts, will be additive in the conventional die. However, by providing one or more spiral mandrels with grooving of opposite hand to the remainder, the helical flows in the passages will be opposite and the non-uniformities will no longer be additive thus resulting in better uniformity of gauge in the product.

In the preferred embodiment herein described, the helical grooves of middle passage 16 is of opposite hand than those of the outer passage 13 and the inner passage 19. It is also within the scope of this invention that the one set of helical grooves of opposite hand to the others is located in either the outer passage or inner passage. It is preferred that in dies having four or more annular passages that the number of spiral mandrels of each hand be equal or as equal as possible.

I claim:

1. Extrusion die apparatus for coextruding thermoplastic material in the form of a tube by means of the blown film process comprising an annular die body, two or more spiral mandrels each having one or more helical grooves in its periphery concentrically mounted within the die body and forming annular passages between the body and one mandrel and between the mandrels, a source of molten thermoplastic material connected to each annular passage wherein the material is forced through the annular passages and extruded from the die in the form of a multilayered tube, the improvement comprising:

the helical groove or grooves of at least one spiral mandrel are of opposite hand than the helical groove or grooves of the remaining spiral mandrel or mandrels.

* * * * *